Figure 1:
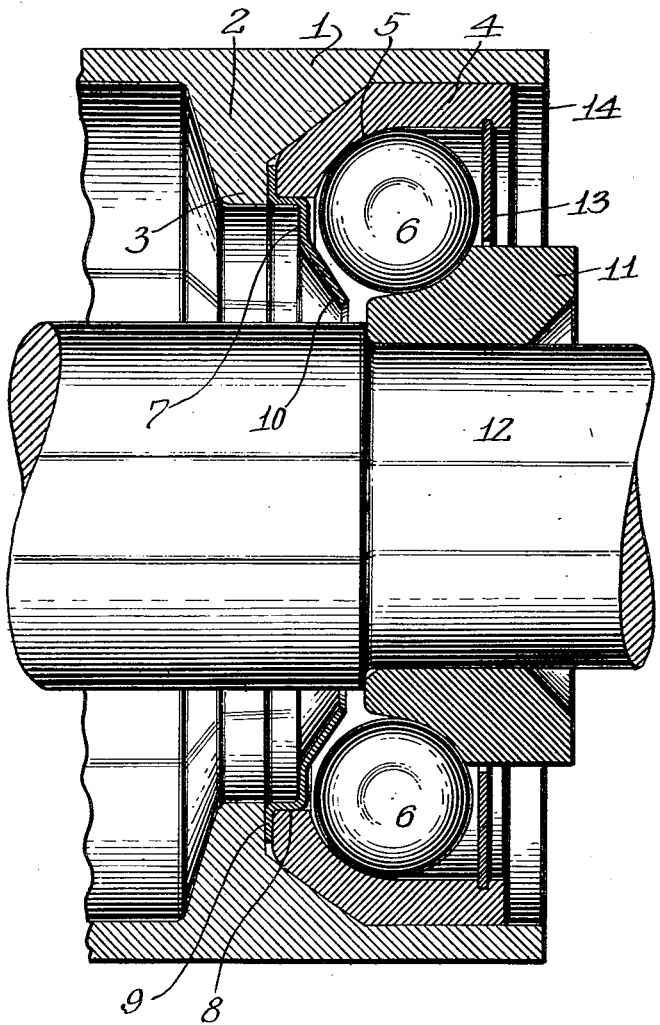

H. MORGAN.
CUP AND CONE BEARING.
APPLICATION FILED APR. 3, 1919.

1,369,979.

Patented Mar. 1, 1921.

Inventor
Harry Morgan,
By
Attorneys

UNITED STATES PATENT OFFICE.

HARRY MORGAN, OF FLINT, MICHIGAN.

CUP-AND-CONE BEARING.

1,369,979.  Specification of Letters Patent.  Patented Mar. 1, 1921.

Application filed April 3, 1919. Serial No. 287,231.

*To all whom it may concern:*

Be it known that I, HARRY MORGAN, a citizen of the United States of America, residing at Flint, in the county of Genesee and State of Michigan, have invented certain new and useful Improvements in Cup-and-Cone Bearings, of which the following is a specification, reference being had therein to the accompanying drawings.

This invention relates to anti-frictional bearings and has special reference to a cup and cone bearing primarily designed for the front axle of a vehicle, for instance a hub bearing on the spindle of an axle or knuckle, but is equally applicable to any bearing for a rotary member.

The primary object of my invention is to simplify the construction and manufacture of a ball cup member by using a novel ball retainer, which permits of a ground ball cup being used in contradistinction to pressed steel polished cup which requires care and expense in manufacture and that portion of the ball cup member which incurs expense has no particular function in the final bearing and consequently can be readily eliminated as long as some substitute is provided therefor to facilitate assembling the bearing.

A further object of my invention is to provide a cup and cone bearing wherein the parts are constructed with a view of saving material and at the same time retain those features by which durability and ease of assembling are secured. With such ends in view, my invention resides in the novel construction to be hereinafter considered and then claimed.

Reference will now be had to the drawing, wherein—

Figure 2:
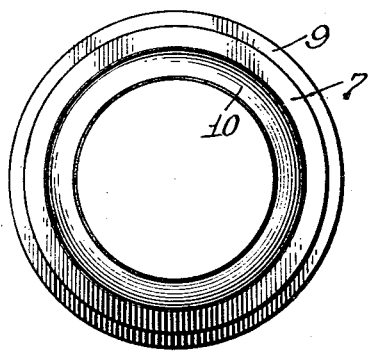

Figure 1 is a longitudinal sectional view of a bearing in accordance with my invention, and Fig. 2 is a front elevation of a pressed steel inner retainer of the bearing.

In the drawing, the reference numeral 1 denotes a hub, front axle housing, bearing or inclosure member which has the inner wall thereof provided with a conical seat 2 and an annular flange 3, such as ordinarily found in the front axle assembly of an automobile.

4 denotes a cup member on the conical seat 2 of the hub 1 and this cup member affords a race 5 for balls 6 or other anti-frictional members.

7 denotes a pressed steel inner retaining member that is somewhat cup shaped and is fitted in the opening 8 of the cup member 4, said retaining member having a peripheral flange 9 sandwiched between the flange 3 of the hub 1 and the inner end of the cup member 4, as best shown in Fig. 1. The retaining member 7 is formed with a crowned or bell shaped portion 10, which for the purpose of assembling the bearing, represents a continuation of the cup member 4, but from a manufacturing standpoint is materially different from an actual integral extension of the cup member, as will hereinafter appear.

11 denotes a cone member on an axle or knuckle spindle 12 which may represent a shaft or other rotary member, said cone member affording an outer race for the ball 6 and supporting the spindle 12 concentric of the hub 1, as is the usual practice.

13 denotes an outer retaining member, preferably in the form of a split annulus or comparatively flat member that may have its peripheral edge mounted in an annular groove 14 provided therefor in the inner wall of the cup member 4, said outer retaining member providing clearance for the cone member 11 and excluding dirt and other foreign matter from the ball races of the bearing.

As intimated in the beginning cup members heretofore manufactured are of pressed steel, the ball race thereof highly polished and on account of the inner end of each cup member being shaped to provide a retainer, it is extremely difficult and sometimes impossible to grind the inside of the ball race of the cup. As a substitute for such a cup member I employ a cup member that may be easily and quickly ground and dimensions very closely followed and by associating the retaining member 7 therewith, I attain in a more practical manner the same result as though the cup member 4 had an integral retaining member. With the flange 9 of the retaining member held between the cup member 4 and the flange 3 of the hub 1, it is impossible for the retaining member to become accidentally displaced, and the bell shaped portion of the retaining member will readily coöperate with the cup member in holding the balls 6 while the bearing is assembled. It is thus possible to bring the outer retaining member 13 into position and the bearing is assembled as a unit, and may be readily installed in a hub with the cone member in position to support the spindle 12 concentrically of the hub.

One embodiment of my invention, has been illustrated, but it is to be understood that the structural elements are susceptible to such variations and modifications as fall within the scope of the appended claim.

What I claim is:—

In a cup and cone bearing having balls, a cup member, and a retaining member having a cylindrical portion snugly fitted in the end of said cup member and having a peripheral flange held against the inner end of said cup member and a bell shaped end as a continuation of said cup member.

In testimony whereof I affix my signature in the presence of two witnesses.

HARRY MORGAN.

Witnesses:
 A. M. DAVIS,
 P. L. OSTRANDER.